US007627730B1

(12) United States Patent
Moll

(10) Patent No.: US 7,627,730 B1
(45) Date of Patent: Dec. 1, 2009

(54) SYSTEM AND METHOD FOR OPTIMIZING A MEMORY CONTROLLER

(75) Inventor: Laurent R. Moll, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 142 days.

(21) Appl. No.: 11/416,872

(22) Filed: May 2, 2006

(51) Int. Cl.
*G06F 12/00* (2006.01)

(52) U.S. Cl. ....................... 711/170; 711/100; 711/105; 711/163; 713/320; 713/600; 713/1; 713/2; 713/100; 710/100

(58) Field of Classification Search ................. 711/100, 711/105, 163, 170; 713/320, 600, 1–2, 100; 710/100
See application file for complete search history.

(56) References Cited

U.S. PATENT DOCUMENTS 5,890,014 A * 3/1999 Long ............................ 710/8
6,631,440 B2 * 10/2003 Jenne et al. ................ 711/105
2005/0120161 A1 * 6/2005 Barth et al. ................ 711/100
2005/0125702 A1 * 6/2005 Huang et al. ............... 713/320

OTHER PUBLICATIONS

DRAM Data Book, published on Oct. 1997.*

* cited by examiner

*Primary Examiner*—Tuan V Thai
*Assistant Examiner*—Zhuo H Li
(74) *Attorney, Agent, or Firm*—Osha • Liang LLP

(57) ABSTRACT

A system and method for optimizing a memory controller. The system includes a memory controller and at least two registers for storing a plurality of operating contexts for the memory controller. The plurality of operating contexts is utilized by the memory controller to optimize the memory controller. According to the system and method disclosed herein, the operating contexts optimize the performance of the memory controller.

27 Claims, 8 Drawing Sheets

333 MHz clock

Read

CAS Latency
15 ns
5 cycles

Data

Shift of 1-2 cycles

Data

SYSTEM AND METHOD FOR OPTIMIZING A MEMORY CONTROLLER

FIELD OF THE INVENTION

The present invention relates to memory systems, and more particularly to a system and method for optimizing a memory controller.

BACKGROUND OF THE INVENTION

Memory controllers are used by computer systems to access memory subsystems, such as dynamic random access memory (DRAM) subsystems. FIG. 1 is a block diagram of a conventional DRAM subsystem 50, including one or more central processing units (CPUs) 52*a* and 52*b*, a memory controller 54 having input/output pins (I/Os), and a DRAM unit 56. The general operation of the DRAM subsystem 50 is well known, where the CPUs 52*a* and 52*b* instruct the memory controller 54 to write to and read from the DRAM unit 56. FIG. 2 is a block diagram of another conventional DRAM subsystem 60, including a CPU 62 and a DRAM unit 64. The DRAM subsystem 60 of FIG. 2 is similar to the DRAM subsystem 50 except that the CPU 62 of the DRAM subsystem 60 of FIG. 2 has an integrated memory controller. As such, the CPU 62 can communicate directly with the DRAM unit 64.

Typically, memory controllers are statically tuned at boot time to run the DRAM unit at the highest possible operating frequency that the memory controller and the DRAM unit will support. This enables the memory controller to perform at higher levels. A problem with some subsystems is that the memory controller is typically not re-tuned once it is tuned to a particular operating frequency. This becomes problematic, because in platforms with a wide workload dynamic range such as laptop computers, a DRAM subsystem, running at the highest possible frequency, consumes a large amount of power even when the computer system is operating in lower workload/power modes. In lower workload/power modes, special controls may be available to improve the power efficiency of a DRAM subsystem. Such special controls include power down, self-refresh, I/O tristating controls, and these special controls are used by many power-efficient platforms. However, the operating frequency of the DRAM unit is still not variable.

Accordingly, conventional solutions waste energy at several levels. First, dynamic power is typically higher because of the higher operating frequencies. Furthermore, maximum signal integrity requirements force the design to use the most aggressive features (e.g., increasing drive strength), which are power-hungry. Furthermore, at the highest operating frequencies, the clock interface between the CPU and the DRAM unit might be suboptimal due to putting the emphasis on bandwidth (e.g., by maximizing the operating frequency) instead of on latency (which can be more important for power efficiency). Conventional solutions have further shortcomings such as the use of a single set of timing parameters, which makes the lower-frequency modes suboptimal in terms of latency and causes the memory system to be less power-efficient.

Some memory controllers are designed to perform at a lower operating frequency when lower performance is less important. FIGS. 3 and 4 are timing diagrams showing read operations at 666 MHz and 333 MHz, respectively. Referring to both FIGS. 3 and 4 together, a problem with conventional solutions is that even though the operating frequency of a memory controller may be scaled down from its highest performance settings to lower performance settings (e.g., 666 MHz to 333 MHz), the number of cycles required to execute a given command (e.g., read command) remains the same (e.g., 10 cycles). So, the absolute amount of time to complete a cycle typically doubles (e.g., 1.5 nanoseconds per cycle to 3 nanoseconds per cycle). Consequently, the speed of the memory controller slows down substantially.

Accordingly, what is needed is an improved system and method for operating a memory controller. The present invention addresses such a need.

SUMMARY OF THE INVENTION

A system and method for optimizing a memory controller is disclosed. The system comprises a memory controller and at least two registers for storing a plurality of operating contexts for the memory controller. The plurality of operating contexts is utilized by the memory controller to optimize the memory controller. According to the system and method disclosed herein, the operating contexts optimize the performance of the memory controller.

DETAILED DESCRIPTION OF THE INVENTION

The present invention relates to memory systems, and more particularly to a system and method for optimizing a memory controller. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention for optimizing a memory controller is disclosed. The system includes a memory controller and at least two registers for storing a plurality of operating contexts for the memory controller. Each operating context provides a set of parameter values, which may include, for example, an operating frequency value, a timing parameter value, a signal-integrity parameter value, a voltage parameter value, and an address parameter value. Each set of parameter values is optimized for a given frequency parameter value, thereby optimizing the performance of memory controller for a given operating frequency. Also, each set of parameter values may be pre-configured or computed in real time. To more particularly describe the features of the present invention, refer now to the following description in conjunction with the accompanying figures.

Although the present invention disclosed herein is described in the context of DRAM memories, the present invention may apply to other types of memories, and still remain within the spirit and scope of the present invention.

Figure 1:
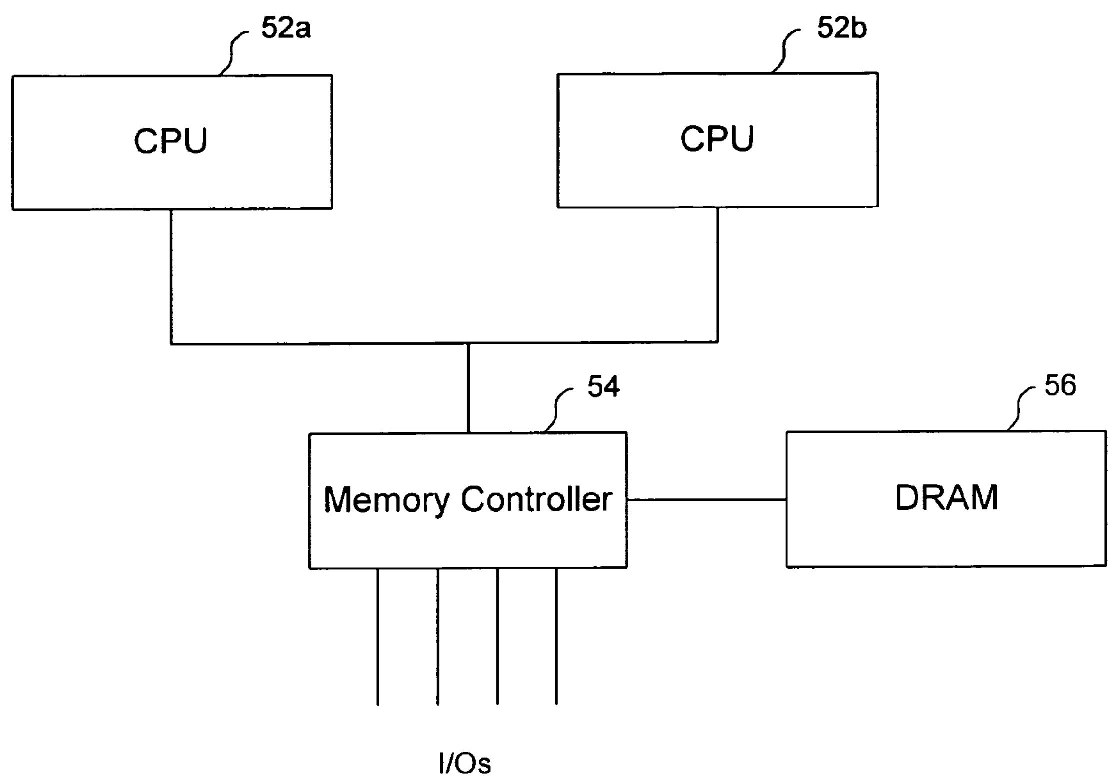
FIG. 1 is a block diagram of a conventional DRAM subsystem.
Figure 2:
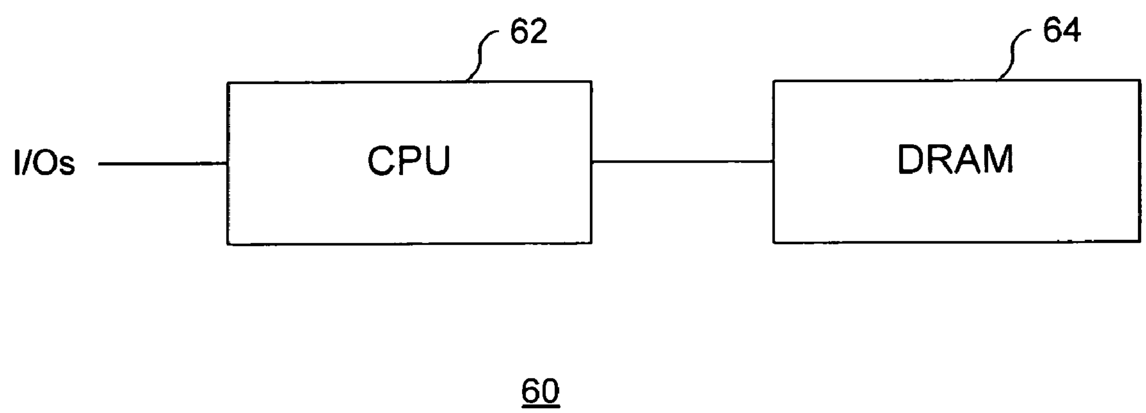
FIG. 2 is a block diagram of another conventional DRAM subsystem.
Figure 3:
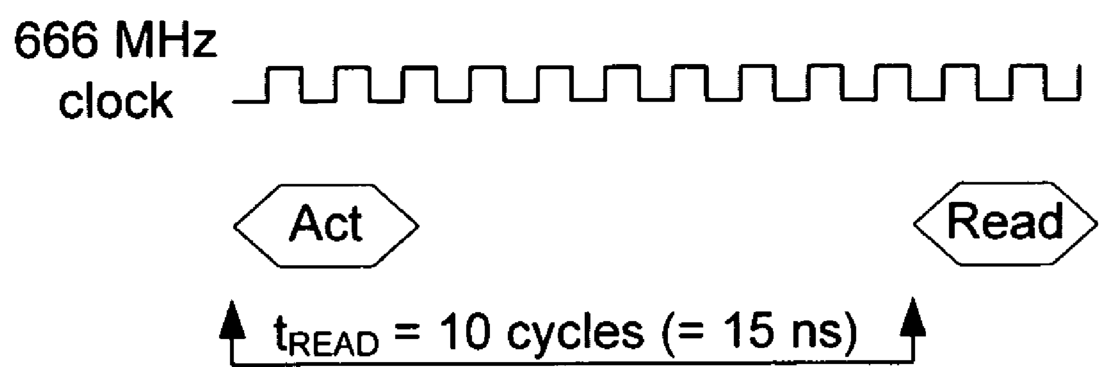
FIG. 3 is a timing diagram showing a read operation at 666 MHz.
Figure 4:
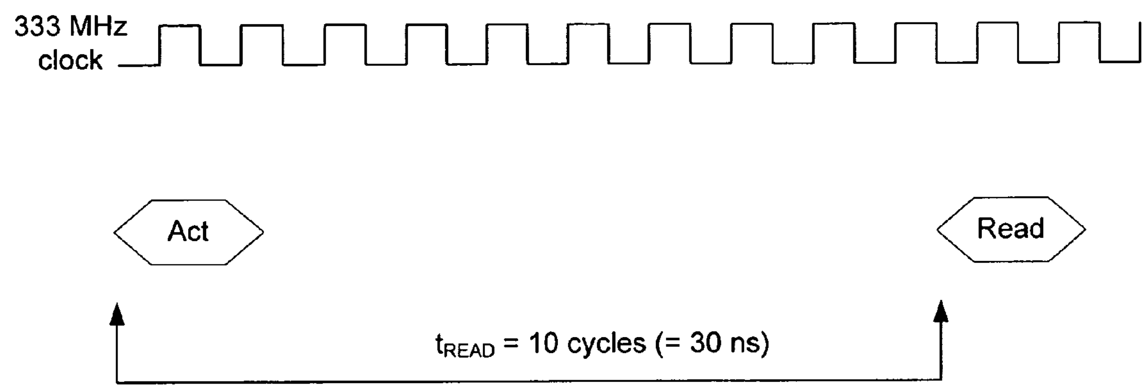
FIG. 4 is a timing diagram showing a read operation at 333 MHz.
Figure 5:
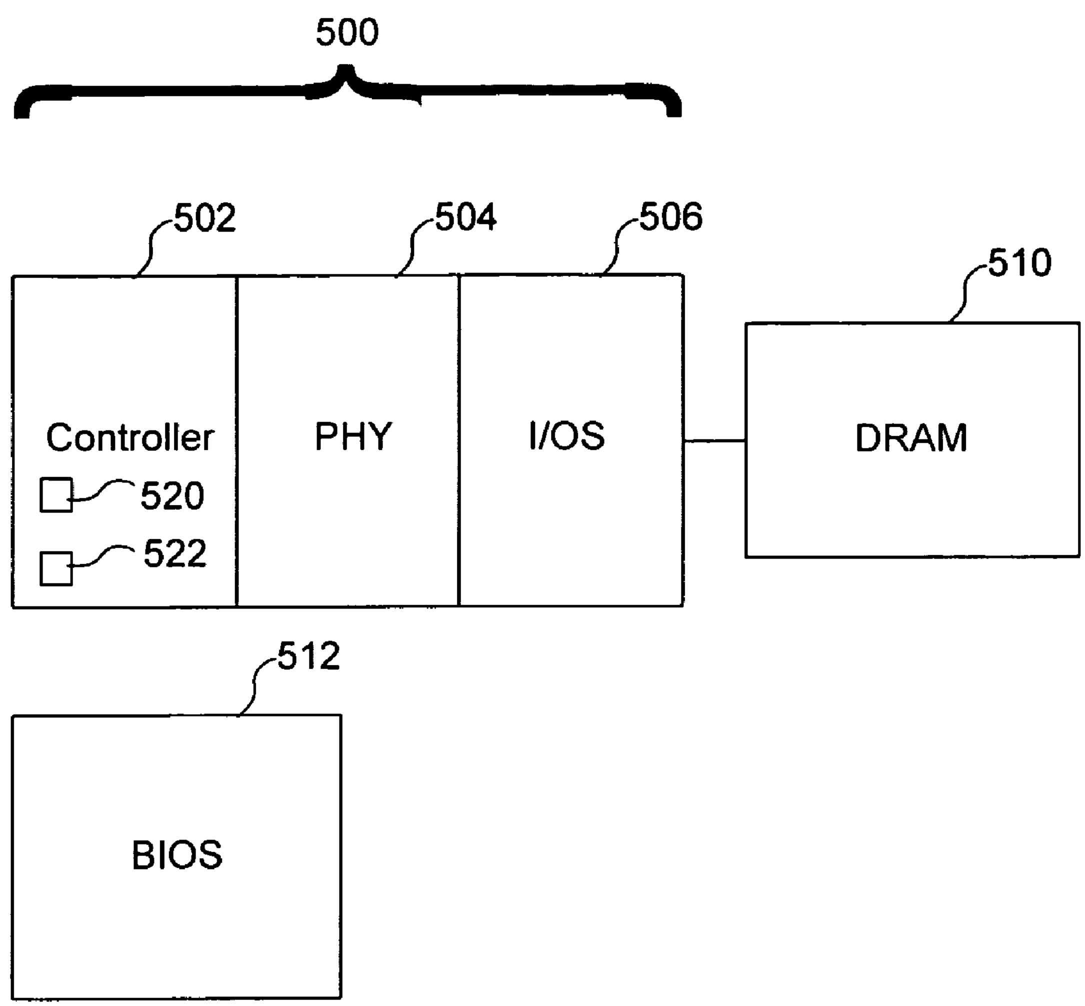
FIG. 5 is a block diagram of a memory controller in accordance with one embodiment of the present invention.

FIG. 5 is a block diagram of a memory controller 500 in accordance with one embodiment of the present invention. The memory controller 500, which includes a controller 502, a PHY 504, and I/Os 506, couples to a DRAM unit 510. A basic input/output system (BIOS)/firmware unit 512 is accessible to the memory controller 500. In one embodiment, the controller 502 has two or more registers 520 and 522 for storing operating contexts. The operating contexts are described in detail below. While the registers 520 and 522 are located in the controller 502, one of ordinary skill in the art will readily recognize that the registers 520 and 522 could be stored in any suitable memory location, and such a number would be within the spirit and scope of the present invention.

Figure 6:
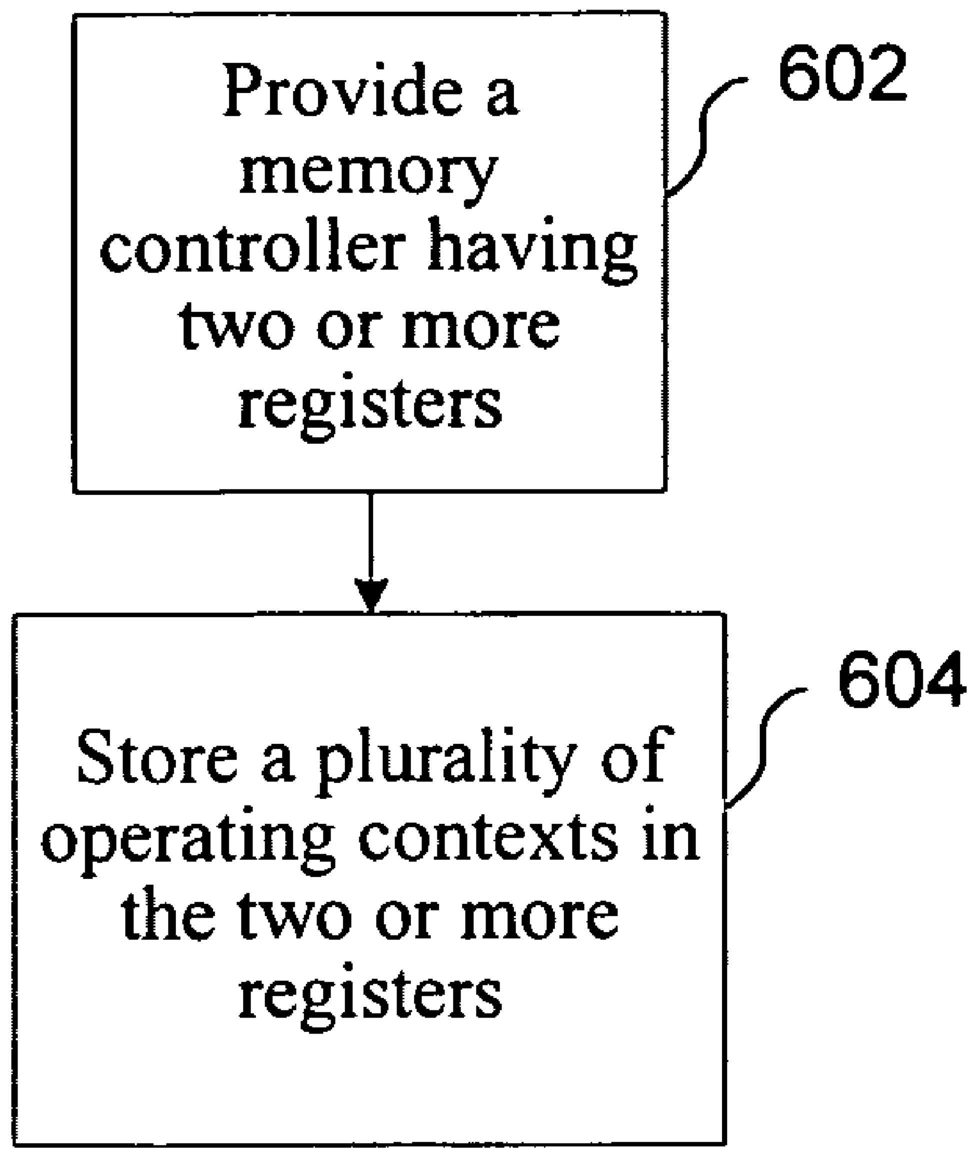
FIG. 6 is a flow chart showing a method for optimizing a memory controller in accordance one embodiment of the present invention.

FIG. 6 is a flow chart showing a method for optimizing a memory controller in accordance one embodiment of the present invention. Referring to both FIGS. 5 and 6 together, the process begins in a step 602 where the memory controller 500 having at least two registers 520 and 522 is provided. Next, in a step 604, the memory controller 500 stores a plurality of operating contexts in the at least two registers. In accordance with the present invention, the plurality of operating contexts is utilized by the memory controller to optimize the memory controller 500.

In accordance with the present invention, the memory controller is programmed based on one of the operating contexts. As described in more detail below, each of the operating contexts comprises a plurality of parameter values, which may include one or more frequency parameter values, timing parameter values, signal-integrity parameter values, power parameter values, DRAM geometry parameter values, and address parameter values. In accordance with the present invention, the parameter values for each operating context may be predetermined or computed in real time. As described in more detail below, the parameter values are used to program the controller 502, the PHY 504, or both the controller 502 and the PHY 504. This enables the memory controller 500 to perform optimally during various operating conditions. For example, each operating context may provide a unique set of controller-related parameter values and/or a unique set of PHY-related parameter values for a given operating frequency. While analog values for the PHY-related parameters may be stored, digital values are preferably stored.

In operation, software in the BIOS/firmware unit 512 reads information (e.g., timing parameters) from the DRAM unit 510 and computes optimal sets parameter values for different operating frequencies (e.g., 333 MHz, 666 MHz, etc.) and stores sets of parameter values in operating contexts in the registers 520 and 522. As indicated above, BIOS/firmware unit 512 may predetermine the parameter values for each operating context or may compute the parameter values in real time. Each register 520 and 522 stores a different operating context (i.e., a different set of parameter values). Although the present invention is described in the context of two registers 520 and 522, one of ordinary skill in the art will readily recognize that there could be any number of registers available to store different operating contexts, and such a number would be within the spirit and scope of the present invention.

Figure 7:
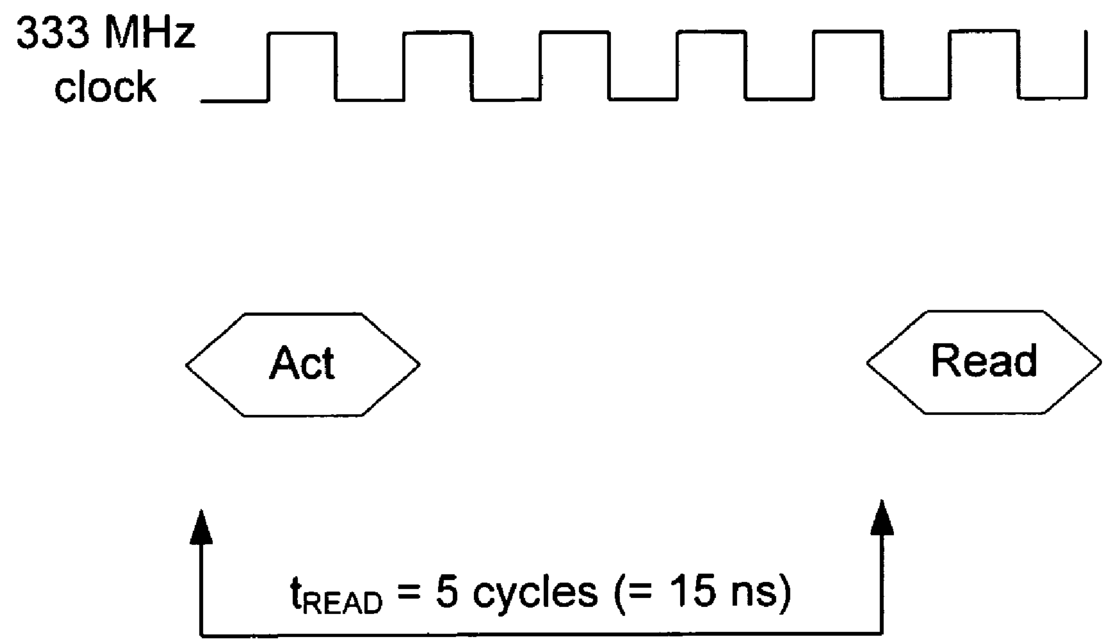
FIG. 7 is a timing diagram showing a read operation at 333 MHz in accordance with one embodiment of the present invention.

FIG. 7 is a timing diagram showing a read operation at 333 MHz in accordance with one embodiment of the present invention. As FIG. 7 illustrates, the memory controller 500 may be programmed with an operating context for a set of optimal parameter values. For example, the operating frequency of the controller 502 may be programmed (e.g., from 666 MHz to 333 MHz) so that the operating frequency of the controller 502 matches that of the DRAM unit 510. Furthermore, the timing parameters of the controller 502 may be programmed to control the number of cycles required to execute instructions. Accordingly, the number of cycles may be programmed to a desired number (e.g., reprogrammed from 10 cycles to 5 cycles) so that the time to complete a cycle may be a desired time (e.g., from 30 nanoseconds per cycle to 15 nanoseconds per cycle). As indicated above, each operating context stores a particular combination of parameter values that are optimized (e.g., to a given operating frequency) so that the overall performance of the memory controller 500 is optimized.

Referring again to FIG. 5, the PHY 504 is an integrated circuit that provides physical access to a digital interface via the I/Os 506. The PHY 506 includes analog components (e.g., phase-locked loops (PLLs), delay-locked loops (DLLs), phase interpolators (PIs), etc.). PHYS are generally difficult to tune. Accordingly, conventional solutions typically do not change the parameter values of PHYs once they are set. In accordance with the present invention, like the controller 502, the PHY 506 may be digitally programmed based on the parameter values of the operation contexts. As described above, each operating context stores a particular combination of parameter values that are optimized so that the overall performance of the memory controller 500 is optimized. This is especially useful when the memory controller 500 operates in the higher operating frequency ranges (e.g., 300 MHz and above). For example, one operating context may be stored for a maximum operating frequency and other operating contexts may be stored for lower operating frequencies, where each operating context provides optimal parameter values to improve overall performance (e.g., minimize latency) of the memory controller 500.

As described above, the operating contexts may include one or more of the following parameters: frequency parameters, timing parameters, signal-integrity parameters, power parameters, DRAM geometry parameters, and address parameters. The following describes these parameters in more detail. Frequency parameters involve various operating frequencies of the memory system, which may include, for example, operating frequencies of the memory controller, the DRAM unit, and the internal logic. Depending on the operating frequency of the DRAM unit and the internal logic, the means to cross from one clock domain to another may change with the various frequencies. For example, the maximum operating frequency of the DRAM unit might be obtained when using an asynchronous clock from the internal clock, while a lower operating frequency of the DRAM unit might be obtained by dividing down the internal operating frequency. This would result in a faster and more power-efficient clock domain crossing as well as result in better latency.

DRAM timing parameters are associated with scheduling the accesses to the DRAM unit. It is important that the DRAM timing parameters are recalculated for each operating frequency so that the latency is as low as possible for a given operating frequency. In one embodiment, as the operating frequency decreases, the number of cycles corresponding to each parameter also decreases in order to keep the absolute timing (i.e., in time units as opposed to number of cycles) to a minimum (within the limits of cycle granularity). In some cases, specific lower operating frequencies can yield better overall latency parameters than higher operating frequencies (i.e., a parameter in cycles multiplied by period is closer to the optimal absolute parameter in nanoseconds). Optimal parameters such as DRAM timing parameters increase efficiency for the memory controller, and the whole system, which yields better power efficiency.

Signal-integrity related parameters include various board and termination parameters. At lower operating frequencies, it is usually possible to degrade the signal-integrity elements in order to reduce power consumption. For example, terminations can be set to higher resistance values (or turned off), and drive strengths can be reduced, which may result in better overall power efficiency. Some timing elements (DLLs, PLLs) can also run in a degraded mode, or off, for even more power savings.

Delay elements (PLL, DLL) can take a fair amount of time to "lock" to a new operating frequency or to new operating conditions (e.g., voltage, timing parameters, etc.). By training ahead of time for each operating context, optimal parameter values used by these elements may be stored, so that when a new operating context is selected, the delay elements can be reset to the values of the new operating context and "lock" very quickly (starting from a point at or close to the newly determined locking range). In one embodiment, the memory controller saves the parameter values for a first operating frequency before changing to a second operating frequency. The memory controller then reloads the saved parameters when switching back to the first operating frequency. Restarting from previously known-good values saves overall training time.

In one embodiment, the last values of the dynamically changing operating parameters may be fed back into the operating context so that the next time the operating context is used, the parameters are most likely closer to the current conditions. This would be useful for tracking temperature variations, for instance, as some parameters such as temperature may drift over time. Accordingly, in one embodiment, the memory controller run at different operating frequencies, one after another, retrain, and then store various parameter values. Retraining thus becomes a very short process, because any new parameter values would be very close to known optimized parameter values. These parameter values may then be used to modify one or more operating contexts for future use. In another embodiment, real-time compensation may be utilized in lieu of retraining.

DRAM geometry parameters involve turning off a part of the DRAM unit or causing a part of the DRAM unit to be quiescent, which may require reshuffling the memory address map. Operating contexts may indicate the relevant address parameters, which should be switchable.

PHY parameters are system and chip dependent due to processing variations, and the PHY elements (e.g., PLLs, DLLs, PIs) are programmable in that they can be digitally controlled. In one embodiment, the PHY elements for various conditions (e.g., frequencies) are trained for different frequencies and the optimal values are stored in operating contexts. Accordingly, when a parameter value such as operating frequency changes, the appropriate operating context may be utilized.

Figure 8:
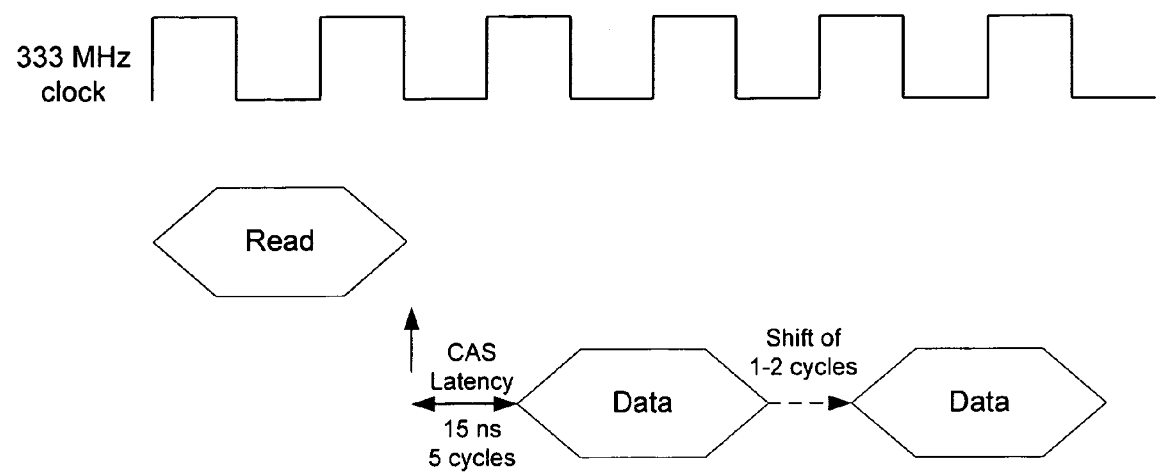
FIG. 8 is a timing diagram showing a read operation at 333 MHz in accordance with another embodiment of the present invention.

FIG. 8 is a timing diagram showing a read operation at 333 MHz in accordance with another embodiment of the present invention. As FIG. 8 illustrates, the column & address strobe (CAS) latency parameter may be programmed to a desired number of cycles (e.g., 5 cycles) and time (e.g., 15 ns). The phase interpolator reads the clock and then provides intermediate phases of the clock (e.g., 90°, 180°, 270°, etc.). Generally, the memory controller can expect data to be available during one of these phases plus a number of cycles. A potential problem is that an increase in operating frequency may cause a delay (e.g., 1-2 cycles) in data retrieval. For example, a 270° phase may optimal with 333 MHz but not with 666 MHz. In accordance with the present invention, two operating contexts may be stored to avoid retraining. One operating context may include parameter values having an optimum phase and optimum number of cycles for 666 MHz, and one operating context may include parameter values having an optimum phase and an optimum number of cycles for 333 MHz.

In one embodiment of the present invention, an application discovers the available DRAM unit(s). In one embodiment, a operating context application in the BIOS/firmware unit 512 or other suitable location (e.g., a processor or the controller 502) has board information and can read the serial presence detect (SPD) read-only memories (ROMs) on DRAM modules to gather published information about the characteristics of the board, the DRAM unit(s), and the memory controller at the various frequencies. The application scans the possible operating frequencies and evaluates and/or computes the most energy-efficient frequencies for a set of important workload/power modes. In one embodiment, logic provides the path between the storage and the location where the contexts are used. In the case of dynamic parameters, the logic can also update the storage based on the latest value of the dynamic parameters before switching. The application then selects an operating context containing an optimal set of parameters values (including operating frequency) given the possible operating modes and the maximum number of contexts provided by the memory controller and/or software/firmware.

The application selects an operating context in various ways. In one embodiment, the application computes the theoretical behavior of a set of parameters values, in terms of latency, bandwidth, power or any other relevant metric, comparing the sets of parameters, and then selects an operating context that contains an optimal set of parameter values. In another embodiment, the application measures the behavior of a set of candidate operating contexts under a real or simulated load. Such measurements may be computed in real time on-line, or predetermined off-line once for a computer system, or predetermined off-line once for a set of computer systems. The measurements may then be integrated to compute parameter values. The application then selects the optimal operating context having an optimal set of parameter values for a given operating frequency or other parameter. A combination of these embodiments (i.e., computing the theoretical behavior of a set of parameters and measuring the behavior of a set of candidate operating contexts) may also be used.

In one embodiment, the application automatically switches one operating context being utilized by the memory controller to another operating context based on one or more events. Such events may in include systems events (e.g., device insertion/removal, AC vs. battery), power events (e.g., getting in or out of a power mode), and perceived workload change or performance of the memory controller.

The context switching may be performed in software, firmware, hardware, or in a combination of software, firmware, and hardware. For example, in one embodiment, software may automatically switch operating contexts if the latency is not critical and/or the application does not require the memory controller to be operational to run the context switching code.

In another embodiment, while one operating context is running in hardware, the application modifies another operating context. The actual operating context switch is purely hardware. This allows for an unlimited number of operating contexts and for fast switching. In another embodiment, multiple operating contexts are stored in hardware to provide a fully autonomous hardware switching of operating contexts. Using hardware to switch operating contexts has several advantages. First, switching in hardware is faster than switching in software, and switching in hardware may be performed while the DRAM unit is still in use. In some circumstances, using software for switching may require all or part of the DRAM unit to be quiescent.

In one embodiment, logic in the memory controller provides fast switching between operating contexts. Information can be read quickly for switching from one predetermined operating context to another predetermined operating context. Also, information can be read quickly for dynamically changing parameters values of a given operating context in real time for immediate use. For example, in one embodiment, two operating contexts are provided, where one controls the DRAM unit and the parameter values of the other operating context are programmed by software in real time before a final command triggers the switch from one operating context to the newly programmed operating context. This creates a compromise between the multi-context hardware implementation and the software implementation.

According to the system and method disclosed herein, the present invention provides numerous benefits. For example, it provides several operating contexts, each optimized for the particular set of parameters. Embodiments of the present invention also provide quick switching between the operating contexts and optimize system efficiency (e.g., power and performance) by switching between operating contexts as needed.

A system and method in accordance with the present invention for optimizing a memory controller has been disclosed. The system includes a memory controller and at least two registers for storing a plurality of operating contexts for the memory controller. Each operating context provides a set of parameter values, which may include, for example, frequency value, a timing parameter value, a signal-integrity parameter value, a voltage parameter value, and an address parameter value. Each set of parameter values is optimized for a given frequency parameter value, thereby optimizing the performance of memory controller for a given operating frequency.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A system comprising:

a memory controller;

a first register, wherein the first register is configured to store a first operating context, wherein the first operating context comprises a first set of timing parameters of the memory controller; and a second register, wherein the second register is configured to store a second operating context, wherein the second operating context comprises a second set of timing parameters of the memory controller, wherein the first and the second set of timing parameters each control a number of cycles required to execute instructions, such that the number of cycles is programmed to a desired number so that a time to complete a cycle is a desired time, wherein the memory controller is configured to use the second register while the first set of timing parameters are being modified in the first register, and wherein the first operating context is stored for a first operating frequency, wherein the second operating context is stored for a second operating frequency, and wherein the second operating frequency is lower than the first operating frequency.

2. The system of claim 1 wherein the memory controller is programmed based on at least one of the operating contexts.

3. The system of claim 1 wherein a first operating context being utilized by the memory controller is switched to a second operating context based on at least one event.

4. The system of claim 3 wherein the first operating context is switched to the second operating context using one or more of software, firmware, and hardware.

5. The system of claim 3 wherein the at least one event comprises one or more of a system event, a power event, and a perceived change in workload or performance of the memory controller.

6. The system of claim 1 wherein each of the operating contexts comprises a plurality of parameter values, wherein the plurality of parameter values comprises one or more of frequency parameter values, timing parameter values, signal-integrity parameter values, power parameter values, DRAM geometry parameter values, and address.

7. The system of claim 1 wherein the operating contexts include one or more of controller-related parameter values and PHY-related parameter values.

8. A method for optimizing a memory controller, the method comprising:

operating the memory controller using a first register, wherein the first register comprises a first operating context, wherein the first operating context comprises a first set of timing parameters of the memory controller; and while operating the memory controller using the first register, programming a second operating context in a second register, wherein the second operating context comprises a second set of timing parameters of the memory controller, wherein programming the second operating context comprises programming a number of cycles required to execute instructions, so that a time to complete a cycle is a desired time, and wherein the first operating context is stored for a first operating frequency, wherein the second operating context is stored for a second operating frequency, and wherein the second operating frequency is lower than the first operating frequency.

9. The method of claim 8 further comprising programming the memory controller based on at least one of the operating contexts.

10. The method of claim 8 further comprising switching the first operating context being utilized by the memory controller to the second operating context based on at least one event.

11. The method of claim 10 wherein the first operating context is switched to the second operating context using one or more of software, firmware, and hardware.

12. The method of claim 10 wherein the at least one event comprises one or more of a system event, a power event, and a perceived change in workload or performance of the memory controller.

13. The method of claim 8 wherein each of the operating contexts comprises a plurality of parameter values, wherein the plurality of parameter values comprises one or more of frequency parameter values, timing parameter values, signal-integrity parameter values, power parameter values, DRAM geometry parameter values, and address parameter values.

14. The method of claim 8 wherein the operating contexts include one or more of controller-related parameter values and PHY-related parameter values.

15. A computer-readable storage medium containing program instructions for optimizing a memory controller, the program instructions which when executed by a computer system cause the computer system to execute a method comprising:

operating the memory controller using a first register, wherein the first register comprises a first operating context, wherein the first operating context comprises a first set of timing parameters of the memory controller; and while operating the memory controller using the first register, programming a second operating context in a second register, wherein the second operating context comprises a second set of timing parameters of the memory controller, wherein programming the second operating context comprises programming a number of cycles required to execute instructions, so that a time to complete a cycle is a desired time, and wherein the first operating context is stored for a first operating frequency, wherein the second operating context is stored for a second operating frequency, and wherein the second operating frequency is lower than the first operating frequency.

16. The computer-readable storage medium of claim 15 further comprising program instructions for programming the memory controlled based on at least one of the operating contexts.

17. The computer-readable storage medium of claim 15 further comprising program instructions for switching a first operating context being utilized by the memory controller to a second operating context based on at least one event.

18. The computer-readable storage medium of claim 17 wherein the first operating context is switched to the second operating context using one or more of software, firmware, and hardware.

19. The computer-readable storage medium of claim 17 wherein the at least one event comprises one or more of a system event, a power event, and a perceived change in workload or performance of the memory controller.

20. The computer-readable storage medium of claim 15 wherein each of the operating contexts comprises a plurality of parameter values, wherein the plurality of parameter values comprises one or more of frequency parameter values, timing parameter values, signal-integrity parameter values, power parameter values, DRAM geometry parameter values, and address parameter values.

21. The system of claim 1, wherein an application utilizing the memory controller selects one of the plurality of operating contexts based at least in part on a computation of the theoretical behavior of a set of parameter values.

22. The system of claim 1, wherein an application utilizing the memory controller selects one of the plurality of operating contexts based at least in part on a measurement of the behavior of a candidate set of operating contexts under a simulated load.

23. The system of claim 1, wherein the system reduces the number of cycles required to complete and instruction.

24. The system of claim 23, wherein the system reduces the number of cycles required to complete an instruction when the memory is running at a lower clock speed.

25. The system of claim 1, wherein the first operating context stored for the first operating frequency and the second operating context stored for the second operating frequency each generate parameter values to improve performance of the memory controller.

26. The method of claim 8, wherein the first operating context stored for the first operating frequency and the second operating context stored for the second operating frequency each generate parameter values to improve performance of the memory controller.

27. The computer-readable storage medium of claim 15, wherein the first operating context stored for the first operating frequency and the second operating context stored for the second operating frequency each generate parameter values to improve performance of the memory controller.

* * * * *